(12) United States Patent
MacInnes et al.

(10) Patent No.: US 9,923,412 B2
(45) Date of Patent: Mar. 20, 2018

(54) POWERING A SELF-SERVICE TERMINAL

(71) Applicant: NCR Corporation, Duluth, GA (US)

(72) Inventors: Donald MacInnes, Angus (GB); James Henderson, Fife (GB)

(73) Assignee: NCR Corporation, Atlanta, GA (US)

( * ) Notice: Subject to any disclaimer, the term of this patent is extended or adjusted under 35 U.S.C. 154(b) by 818 days.

(21) Appl. No.: 14/169,835

(22) Filed: Jan. 31, 2014

(65) Prior Publication Data

US 2015/0222145 A1 Aug. 6, 2015

(51) Int. Cl.
*H02J 7/00* (2006.01)
*H02J 9/00* (2006.01)
*H02J 9/06* (2006.01)
*H02M 7/04* (2006.01)
*G06Q 40/02* (2012.01)
*H02J 7/35* (2006.01)

(52) U.S. Cl.
CPC ............... *H02J 9/06* (2013.01); *G06Q 40/02* (2013.01); *H02J 7/35* (2013.01); *H02M 7/04* (2013.01); *Y02B 10/72* (2013.01); *Y10T 307/615* (2015.04); *Y10T 307/62* (2015.04); *Y10T 307/625* (2015.04)

(58) Field of Classification Search
CPC .. G05F 5/00; G06F 17/00; G06F 17/60; H02J 4/00; G06K 15/00; G06K 15/02; G06K 15/10; A01K 39/01

USPC .......... 307/65, 64, 66, 82, 80; 700/286, 287, 700/285; 705/37, 35, 34; 235/379, 380, 235/382, 383; 119/429, 426, 424
See application file for complete search history.

(56) References Cited

U.S. PATENT DOCUMENTS

| | | | | |
|---|---|---|---|---|
| 7,591,413 | B1 * | 9/2009 | Block | G07F 19/20 235/379 |
| 9,251,540 | B1 * | 2/2016 | Magee | G06Q 40/02 |
| 2005/0236476 | A1 * | 10/2005 | Murray | G06Q 30/02 235/383 |
| 2012/0005073 | A1 * | 1/2012 | Gnorski | G07F 19/209 705/39 |
| 2012/0191262 | A1 * | 7/2012 | Marcus | G06Q 30/0202 700/286 |
| 2014/0049117 | A1 * | 2/2014 | Rahman | H02J 4/00 307/82 |
| 2014/0182518 | A1 * | 7/2014 | Boehm | A01K 5/0291 119/429 |

* cited by examiner

*Primary Examiner* — Rexford Barnie
*Assistant Examiner* — Jagdeep Dhillon
(74) *Attorney, Agent, or Firm* — Schwegman, Lundberg & Woessner

(57) ABSTRACT

The present invention provides a method and apparatus for powering a Self Service Terminal (SST), comprising a primary power supply, a back-up power supply, at least one renewable power supply, and a power management controller for selectively using the renewable power supply when a first power level is available from the renewable power supply, and to supplement or replace the renewable power supply with the primary power supply and/or the back-up power supply when a second power level is required by the SST that exceeds the first power level.

15 Claims, 3 Drawing Sheets

POWERING A SELF-SERVICE TERMINAL

FIELD OF THE INVENTION

The present invention relates to powering a Self-Service Terminal (SST) and, in particular but not exclusively, to a method and apparatus utilising a number of different power sources for supplying power to an SST in an uninterruptable manner.

A typical SST includes an Automated Teller Machine (ATM) which presents one or more bank notes to a customer in response to a customer transaction at the ATM. A conventional ATM requires a power supply for it to effectively operate in all modes of operation, such as dormant or idle when in a standby mode of operation and active when a transaction is being made at the ATM.

Conventional ATMs are powered by a mains AC power supply which is provided by the Grid. Conventional ATMs are often also provided with a back-up power supply or a so-called uninterruptable power supply (UPS) which includes a number of batteries that are used to either boost the mains power supply or to replace the mains power supply in the event of a drop in, or a complete loss of, the mains power supply respectively.

However, in many locations around the world, such as developing countries, a mains power supply is often not available or is prone to frequent outages which result in undesirable downtime of the ATM, particularly if a back-up power supply is not available or insufficient. Downtime of an ATM causes inconvenience to customers wanting to use the ATM and adversely affects the reputation of a respective banking establishment providing the ATM.

Furthermore, a conventional ATM includes an AC powered UPS which requires an inverter to convert a DC power supply from a number of back-up batteries into an AC power supply for the UPS when a mains AC power supply is not available or insufficient. A conventional ATM also requires a rectifier to convert a mains AC power supply to a DC power supply for charging the back-up batteries when a mains AC power supply is available and sufficient. Conversion of power supplies is particularly inefficient and a significant amount of energy, particularly in the form of heat, is lost during such conversion.

SUMMARY OF THE INVENTION

It is an aim of the present invention to at least partly mitigate the above-mentioned problems.

It is an aim of certain embodiments of the present invention to provide a method and apparatus for powering an SST in an uninterruptable manner irrespective of the location of the SST, whilst reducing the overall cost of the SST, increasing the efficiency of energy conversion required by the SST, reducing the space required by the SST, and utilising a number of different power sources.

It is an aim of certain embodiments of the present invention to provide a method and apparatus for powering an SST whilst providing instantaneous power to the SST on demand, reducing the amount of heat loss during conversion of a power supply, and reducing the risk of downtime of the SST in the event of a loss or drop in the mains AC power supply.

According to a first aspect of the present invention there is provided apparatus for powering a Self Service Terminal (SST), comprising:
 a primary power supply;
 a back-up power supply;
 at least one renewable power supply; and
 a power management controller for selectively using the renewable power supply when a first power level is available from the renewable power supply, and to supplement or replace the renewable power supply with the primary power supply and/or the back-up power supply when a second power level is required by the SST that exceeds the first power level.

Aptly, the back-up power supply is provided by at least one rechargeable battery and the at least one renewable power supply is provided by at least one solar cell and/or at least one wind turbine.

Aptly, the controller is configured to enable at least one of the primary power supply and the renewable power supply to selectively recharge the at least one rechargeable battery.

Aptly, the primary power supply and/or back-up power supply is a DC power supply.

Aptly, the apparatus further comprises:
 a rectifier to convert a mains AC power supply to the primary DC power supply.

Aptly, the primary DC power supply is a 24 v DC power supply.

Aptly, the second power level required by the SST is responsive to a mode of operation of the SST.

Aptly, the second power level is about around 75-200 W when the mode of operation is dormant and about around 400-500 W when the mode of operation is active.

Aptly, the first power level is about around 100-200 W.

Aptly, the apparatus further comprises:
 a further back-up power supply for the controller to selectively use until at least one of the primary power supply, back-up power supply and renewable power supply is available and sufficient.

According to a second aspect of the present invention there is provided a Self Service Terminal (SST) comprising the apparatus as claimed in claim 1.

According to a third aspect of the present invention there is provided a method of powering an SST, comprising:
 selectively using a renewable power supply when a first power level is available from the renewable power supply; and
 supplementing or replacing the renewable power supply with a primary power supply and/or a back-up power supply when a second power level is required by the SST that exceeds the first power level.

Aptly, the method further comprises:
 determining the second power level required by the SST;
 determining the first power level available from the renewable power supply; and
 comparing the second power level with the first power level to determine if the second power level exceeds the first power level.

Aptly, the method further comprises:
 providing the back-up power supply by at least one rechargeable battery; and
 providing the renewable power supply by at least one solar cell and/or at least one wind turbine.

Aptly, the method further comprises:
 selectively enabling the primary power supply and/or renewable power supply to recharge the rechargeable battery.

Aptly, the method further comprises:
 determining a state of the primary power supply; and
 selectively using at least one of the back-up power supply and renewable power supply to replace or supplement the primary power supply.

Aptly, the method further comprises:

selectively using a further back-up power supply until at least one of the primary power supply, back-up power supply and renewable power supply is available and sufficient.

Aptly, the method further comprises:

converting a mains AC power supply to a primary DC power supply.

According to a fourth aspect of the present invention there is provided apparatus for powering a Self Service Terminal (SST), comprising:

a primary power supply;

at least one secondary power supply; and a controller for selecting at least one of the primary power supply and the at least one secondary power supply responsive to at least one of a mode of operation of the SST, a state of the primary power supply, and a state of the at least one secondary power supply.

Certain embodiments of the present invention may provide a method and apparatus for uninterruptedly powering an SST in a location where mains power loss and/or drops are commonplace.

Certain embodiments of the present invention may provide a method and apparatus for uninterruptedly powering an SST by utilising a number of different power sources in an efficient manner.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
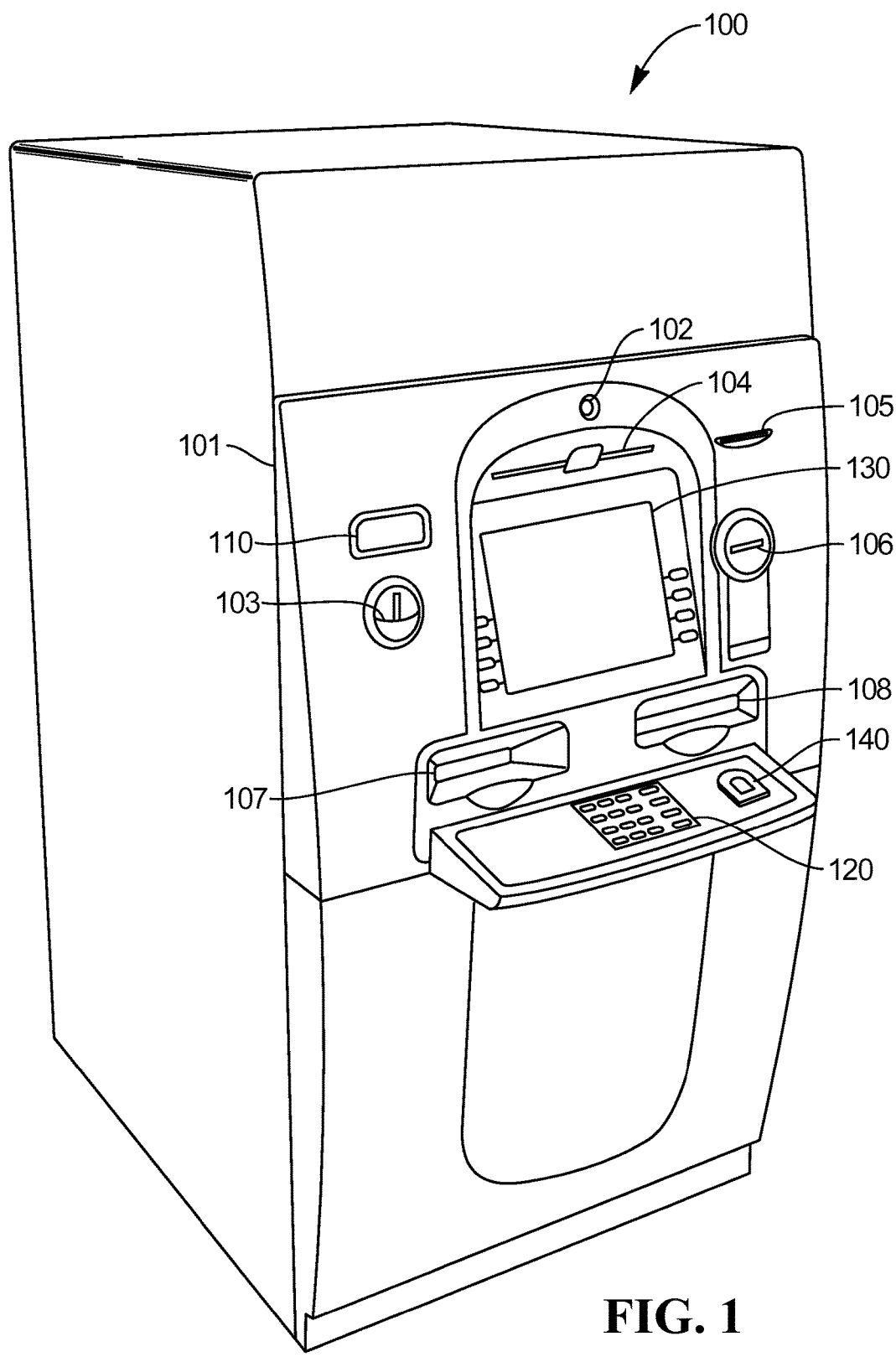
FIG. 1 illustrates a schematic of a Self-Service Terminal (SST) such as an ATM.

In the drawings like reference numerals refer to like parts.

FIG. 1 illustrates a self-service cheque depositing terminal in the form of an image-based cheque depositing Automated Teller Machine (ATM) 100. It will be appreciated that certain embodiments of the present invention are applicable to a wide variety of terminals in which items of media such as cheques and/or currency notes and/or giros and/or lottery tickets and/or other such flexible sheet-like items of media are to be transported and directed in different directions. The type of terminal will of course be appropriate for the type of items of media being transported.

As illustrated in FIG. 1, the ATM 100 includes a fascia 101 coupled to a chassis (not shown). The fascia 101 defines an aperture 102 through which a camera (not shown) images a customer of the ATM 100. The fascia 101 also defines a number of slots for receiving and dispensing media items and a tray 103 into which coins can be dispensed. The slots include a statement output slot 104, a receipt slot 105, a card reader slot 106, a cash slot 107, a further cash slot 108 and a cheque input/output slot 110. The slots and tray are arranged such that the slots and tray align with corresponding ATM modules mounted within the chassis of the ATM.

The fascia 101 provides a customer interface for allowing an ATM customer to execute a transaction. The fascia 101 includes an encrypting keyboard 120 for allowing an ATM customer to enter transaction details. A display 130 is provided for presenting screens to an ATM customer. A fingerprint reader 140 is provided for reading a fingerprint of an ATM customer to identify the ATM customer.

Within the chassis of the ATM it will be understood that items of media must be transported from time to time from one location to another. The pathway taken by any particular item of media is dependent upon an operation being carried out at the ATM and may also be dependent upon other factors such as whether a customer of the ATM is authorised and/or whether an item of media being transported satisfies certain pre-determined criteria.

During a customer transaction at the ATM 100, items are moved along selected transport paths by respective transport members. For example, at least one banknote may be removed from a respective currency cassette located in the ATM by a pick unit and transported along a transport path by transport belts and/or on a transport carriage to be presented to the customer. Motors are used to drive such transport members and a controller within the ATM controls the motors in response to the customer transaction. Thus, a sufficient amount of electrical power is required by the ATM to operate both in an idle mode of operation and in an active mode of operation.

Figure 2:
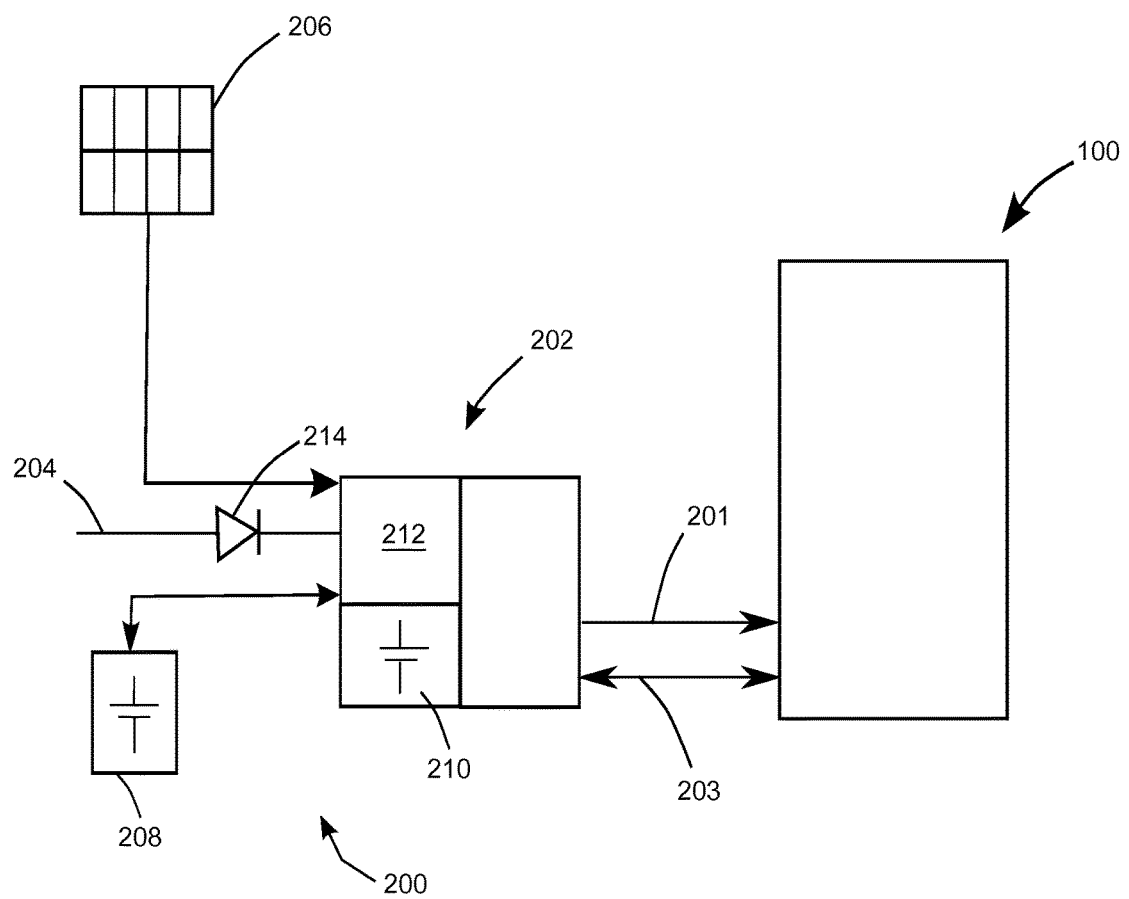
FIG. 2 illustrates a schematic diagram of apparatus according to an embodiment of the present invention for powering an ATM.

As illustrated in FIG. 2, the ATM 100 is connected to an uninterruptable power supply (UPS) apparatus 200 according to certain embodiments of the present invention. The ATM 100 is connected to the apparatus 200 via a power connection 201 which is input to the ATM 100 and a communication connection 203 which provides for two-way communication between the apparatus and the ATM. The communication connection 203 may take the form of a USB connection.

The UPS apparatus 200 includes a power controller 202 connected to the ATM 100. The controller 202 as shown in FIG. 2 has been shown located externally of the ATM 100 for simplicity but it can be envisaged that the UPS apparatus according to certain embodiments of the present invention may partially or wholly form part of the ATM, e.g. the controller 202 may be located inside the ATM chassis or may be mounted externally of the ATM chassis. Alternatively, the controller 202 of the UPS apparatus 200 may be located remotely from the ATM 100.

The UPS apparatus 200 has three different power supply inputs; a mains power supply 204, a renewable power supply 206 provided by at least one solar panel, and a back-up power supply 208 in the form of an external rechargeable battery. The controller 202 includes a further back-up power supply in the form of an internal rechargeable battery 210. It will be understood the renewable power supply may be provided by a variety of different renewable energy sources, such as at least one photovoltaic cell, wind turbine, water turbine, or the like. The renewable energy source may be mounted on the ATM 100 or may be located remotely from the ATM 100.

The controller 202 is configured to select one or more of the power supplies 204, 206, 208, 210 responsive to a state of one or more of the power supplies and/or a mode of operation of the ATM 100. The controller 202 also includes a charging module 212 for selectively recharging the batteries 208, 210 from the mains power supply 204 and/or the renewable power supply 206. The controller 202 is further configured to determine a state of the renewable energy supply 206, the mains power supply 204 and the battery power supplies 208, 210.

Figure 3:
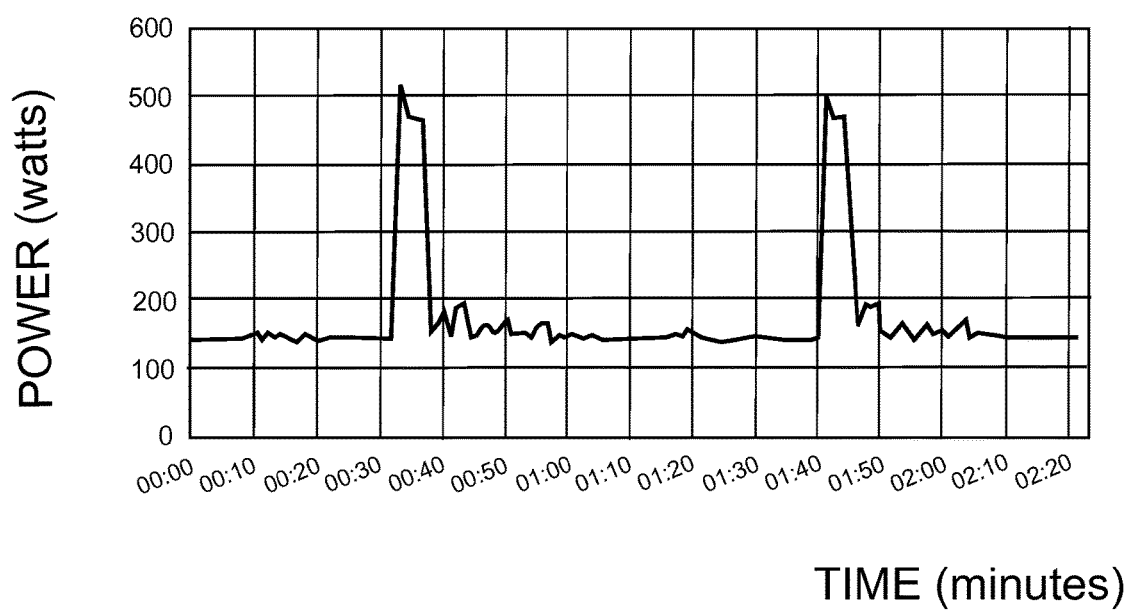
FIG. 3 illustrates a graph to show the power level requirements of the ATM during an idle mode of operation and an active mode of operation.

The controller 202 is further configured to determine a power level requirement of the ATM 100 at a point in time, such as a first power level when the ATM is in an idle mode of operation and a second power level when the ATM is in an active mode of operation, such as during a customer transaction. As shown in FIG. 3, the power demand of the ATM when in an idle or stand-by mode of operation is from around 75 watts to around 200 watts and when a transaction is being made at the ATM the power demand of the ATM is from around 400 watts to around 500 watts. Optionally, the controller 202 may comprise an interface to an application program executing on the ATM 100 such that the application program indicates to the controller 202 via the interface which modules (e.g. dispenser module, deposit module, recycler module etc.) within the ATM will be used for a particular mode of operation of the ATM and thus the required power levels of the ATM. For example, the deposit module may have lower power requirements than the dispenser module so the renewable power supply of the UPS apparatus 200 may be sufficient to satisfy a deposit transaction at the ATM 100, whilst a dispense transaction may require a higher power level and thus an alternative or supplemental power supply.

In operation, when sufficient power is available from the solar panel 206 to power the ATM 100 whilst operating in an idle mode of operation, for example, the controller 202 will selectively utilise the renewable power supply alone. For example, when a maximum power level of from around 100 to around 200 watts is available from the renewable power supply 206, the controller will utilise the renewable power supply to solely power the ATM in an idle mode of operation. Where a maximum power level is available from the renewable power supply, the controller may trickle charge the internal and/or external batteries 208, 210 by using excess available power from the renewable power supply 206.

In the event that the amount of power available from the renewable power supply 206 is not sufficient to power the ATM in an idle mode of operation, such as at night when solar radiation is a minimum, the controller 202 is adapted to selectively switch the power supply from the solar panel 206 to at least one of the mains power supply 204, the internal battery power supply 210 and the external battery power supply 208. In the event that the mains power supply is not available or is insufficient, the controller 202 is adapted to selectively use the internal battery power supply 210 or the external battery power supply 208 to power the ATM.

Furthermore, if the power level required by the ATM increases, for example from an idle mode of operation to an active mode of operation when a transaction is initiated at the ATM, and the power level required by the ATM is greater than the power level available from the renewable power supply 206, the controller 202 will selectively use the mains power supply 204 and/or one of the battery power supplies 208, 210 to replace or supplement the renewable power supply 206. If the mains power supply 204 is insufficient or if there is a drop in the mains power supply, the controller 202 is enabled to switch from the mains power supply to at least one of the battery power supplies 208, 210 or to supplement the mains power supply with one or both of the battery power supplies 208, 210.

The controller 202 will use the renewable power supply 206 whenever available and sufficient. When solar power is not available or is insufficient, e.g. during a transaction power spike, the controller 202 will selectively use the mains power supply 204 if available as a top-up or replacement to the solar power supply. If there is no mains power supply available, the controller 202 will selectively use the internal battery power supply 210 until either the solar and/or mains power supply is available and sufficient to power the ATM in a particular mode of operation. If the internal battery power supply is insufficient, the controller 202 will use the external batteries 208 until the solar, mains, or internal batteries are available and sufficient.

The controller 202 is further enabled to allow the solar panel 206 to recharge the internal and/or external battery power supplies 208, 210, particularly when the ATM is in an idle mode of operation where the power level required by the ATM is at a minimum.

The UPS apparatus 200 may be a DC UPS such that a rectifier 214 is required to convert a mains AC power supply into a mains DC power supply for the DC UPS. Alternatively, the UPS apparatus may require an AC power supply input and thus be an AC UPS. Similarly, the UPS may provide an AC or DC power supply to the ATM depending on the power supply requirements of the ATM. The solar panel 206 and the internal and external batteries 208, 210 provide a renewable DC power supply directly to the UPS thus requiring no conversion from AC to DC when the UPS is a DC UPS requiring a DC input power supply. Therefore, there is no need for a solar inverter and the only required conversion from AC to DC is for the mains DC power supply for a DC UPS. This has the advantage that only one conversion is required thereby minimising significant energy loss, particularly in the form of heat, during such power conversion, thus providing an efficient power control apparatus.

The UPS according to certain embodiments of the present invention has a capacity of approximately 770 watts at approximately 4 minutes. The UPS includes approximately four internal rechargeable 6 v batteries, each battery having approximately three cells. The UPS has an efficiency of approximately 78% and a margin of approximately 20%. The UPS has an effective power of approximately 240 watts (60 watts per battery) and provides approximately 60 watts at approximately 30 minutes. The UPS in accordance with certain embodiments of the present invention has a volume of approximately 250 mm cubed.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. Apparatus for powering a Self Service Terminal (SST), comprising:
a primary power supply;
a back-up power supply;
at least one renewable power supply;
and a two-way communication connection between the apparatus and the SST; and
a power management controller for selectively using the renewable power supply when a first power level is available from the renewable power supply, and to supplement or replace the renewable power supply with the primary power supply and/or the back-up power supply when a second power level is required by the SST that exceeds the first power level, wherein the two-way Universal Serial Bus (USB) communication connection for determining by the power management controller a mode of operation for the ATM and a selection based on the mode of operation of one of the power supplies, and wherein the apparatus is external to the SST, and wherein the power management controller further configured to receive required power levels for integrated modules of the SST for the mode of operation, and wherein the integrated modules include one or more of: a dispenser module, a deposit module, and a recycler module.

2. The apparatus as claimed in claim 1, wherein the back-up power supply is provided by at least one rechargeable battery and the at least one renewable power supply is provided by at least one solar cell and/or at least one wind turbine.

3. The apparatus as claimed in claim 2, wherein the controller is configured to enable at least one of the primary power supply and the renewable power supply to selectively recharge the at least one rechargeable battery.

4. The apparatus as claimed in claim 1, wherein the primary power supply and/or back-up power supply is a DC power supply.

5. The apparatus as claimed in claim 1, further comprising:
a further back-up power supply for the controller to selectively use until at least one of the primary power supply, back-up power supply and renewable power supply is available and sufficient.

6. The apparatus as claimed in claim 1, wherein the second power level required by the SST is responsive to a first mode of operation of the SST.

7. The apparatus as claimed in claim 6, wherein the second power level is about around 75-200 W when the first mode of operation is dormant and about around 400-500 W when the mode of operation is active.

8. The apparatus as claimed in claim 1, wherein the first power level is about around 100-200 W.

9. A method of powering an SST, comprising:
selectively using a renewable power supply when a first power level is available from the renewable power supply,
supplementing or replacing the renewable power supply with a primary power supply and/or a back-up power supply when a second power level is required by the SST that exceeds the first power level; and
switching between the renewable power supply, the primary power supply, and the backup power supply based on a mode of operation for the SST communicated to a controller through a two-way Universal Serial Bus (USB) communication connection between the controller and the SST, wherein the controller is external to the SST, and receiving, by the controller, required power levels for integrated modules of the SST for the mode of operation, and wherein the integrated modules include one or more of: a dispenser module, a deposit module, and a recycler module.

10. The method as claimed in claim 9, further comprising:
determining the second power level required by the SST;
determining the first power level available from the renewable power supply; and
comparing the second power level with the first power level to determine if the second power level exceeds the first power level.

11. The method as claimed in claim 10, further comprising:
providing the back-up power supply by at least one rechargeable battery; and
providing the renewable power supply by at least one solar cell and/or at least one wind turbine.

12. The method as claimed in claim 11, further comprising:
selectively enabling the primary power supply and/or renewable power supply to recharge the rechargeable battery.

13. The method as claimed in claim 11, further comprising:
determining a state of the primary power supply; and
selectively using at least one of the back-up power supply and renewable power supply to replace or supplement the primary power supply.

14. The method as claimed in claim 11, further comprising:
selectively using a further back-up power supply until at least one of the primary power supply, back-up power supply and renewable power supply is available and sufficient.

15. Apparatus for powering a Self Service Terminal (SST), comprising:
a primary power supply;
at least one secondary power supply, and
a controller for selecting at least one of the primary power supply and the at least one secondary power supply responsive to at least one of a mode of operation of the SST communicated from the SST to the controller through a two-way Universal Serial Bus (USB) communication connection between the SST and the controller, wherein the apparatus is external to the SST, a state of the primary power supply, and a state of the at least one secondary power supply, and wherein the controller further configured for receiving required power levels for integrated modules of the SST for the mode of operation, and wherein the integrated modules include one or more of: a dispenser module, a deposit module, and a recycler module.

* * * * *